United States Patent [19]

Bomer et al.

[11] Patent Number: 4,608,619
[45] Date of Patent: Aug. 26, 1986

[54] GROUND FAULT VOLTAGE LIMITING FOR A LOCOMOTIVE ELECTRIC TRACTION MOTOR

[75] Inventors: Michael O. Bomer, Country Club Hills; Richard F. Chudoba, Downers Grove, both of Ill.

[73] Assignee: General Motors Corporation, Detroit, Mich.

[21] Appl. No.: 712,783

[22] Filed: Mar. 18, 1985

[51] Int. Cl.[4] .............................................. H02H 7/08
[52] U.S. Cl. ........................................ 361/31; 361/42; 361/72; 318/434
[58] Field of Search ............................ 361/42, 31, 72; 318/434, 436

[56] References Cited

U.S. PATENT DOCUMENTS 4,495,450  1/1985  Tokizaki et al. ..................... 318/138

FOREIGN PATENT DOCUMENTS

2152308  7/1985  United Kingdom ................. 361/31

Primary Examiner—A. D. Pellinen
Assistant Examiner—H. L. Williams
Attorney, Agent, or Firm—Mark A. Navarre

[57] ABSTRACT

The traction motors of a locomotive are voltage limited to a variable extent to permit continued motor operation following the occurrence of moisture induced ground faulting. The heat generated by the continued motor operation dries the moisture which induced the ground faulting, and the voltage limit is progressively increased toward a normal level for each specified period of motor operation with no ground faulting.

10 Claims, 7 Drawing Figures

GROUND FAULT VOLTAGE LIMITING FOR A LOCOMOTIVE ELECTRIC TRACTION MOTOR

This invention relates to the control of a locomotive electric traction motor and more particularly to a method and apparatus for responding to a sensed ground fault.

BACKGROUND OF THE INVENTION

It is common practice in the control of locomotive traction motors to provide protection systems for interrupting the motor voltage supply upon the detection of a ground fault or flashover in the motor. In some systems, the reconnection of motor voltage is manually initiated by the operator; in other systems, the reconnection is automatically initiated after a predetermined time interval of interruption. In either type of system, the motor voltage supply is (or should be) permanently interrupted in the event of repeated ground faulting or flashover indicative of a so-called hard failure. In such event, the affected motor should be serviced before operation is resumed.

A disadvantage of protective systems of the above type is that ground faulting caused by an accumulation of moisture on the traction motor windings can result in permanent interruption of the motor voltage. As a result, the motor is effectively disabled until the moisture dries.

SUMMARY OF THE INVENTION

This invention provides a controller which interfaces with protective systems of the type described above but which prevents a permanent interruption of the motor voltage when the accumulation of moisture induces a ground fault. Ground faults can also be induced by so-called hard failures such as an insulation failure, and normally such ground faults are indistinguishable from those induced by moisture. However, this invention recognizes that when a ground fault is moisture induced, a permanent shutdown of the motor voltage may be avoided by imposing a variable limit on the voltage supplied to the motor. If the sensed ground fault is induced by a hard failure, reducing the motor voltage will not prevent further ground faulting and the protective system will eventually effect a permanent shutdown of the motor voltage. If the sensed ground fault is moisture induced, it is likely that following the temporary interruption of motor voltage effected by the protective system, the reduced voltage limit will permit continued motor operation, albeit at a lower power level. In such case, the heat generated by the continued motor operation will dry the moisture, whereafter the voltage limit may be returned to a normal level.

In mechanizing the control described above, this invention interfaces with a voltage limit circuit of the type normally used in the control of locomotive traction motors. Typically, the voltage limit in such circuits is fixed at a value determined by the design limits of the motors. According to this invention, however, the voltage limit value is temporarily reduced in response to the sensing of a ground fault with no flashover to permit continued operation of the motor at a lower power level as described above.

Specifically, the controller of this invention operates in response to a sensed ground fault by immediately reducing the motor voltage limit to a fraction (one-half in the illustrated embodiment) of the motor voltage in effect just prior to the ground fault. Following the temporary interruption of motor voltage effected by the protective system, the voltage limit is incremented by a reference amount for each predetermined period of successful motor operation with no ground faults. However, if further ground faults occur, the control effects a further, similar reduction of the voltage limit until no ground faults occur or until the limit is reduced to a reference low value. If after the traction motor has been successfully operated for the predetermined period at a reduced voltage limit and the controller effects an increment of the voltage limit, a further ground fault will cause the voltage limit to be decremented to the value at which the motor was successfully operated. If the voltage limit has been reduced to the reference low value, and a further ground fault occurs, no increase of the voltage limit is permitted until a motor correction has been attempted.

While the controller of this invention may be used in conjunction with protective systems of the automatic or manual types as described above, it is illustrated herein in connection with an automatically operated protection system.

Figure 1:
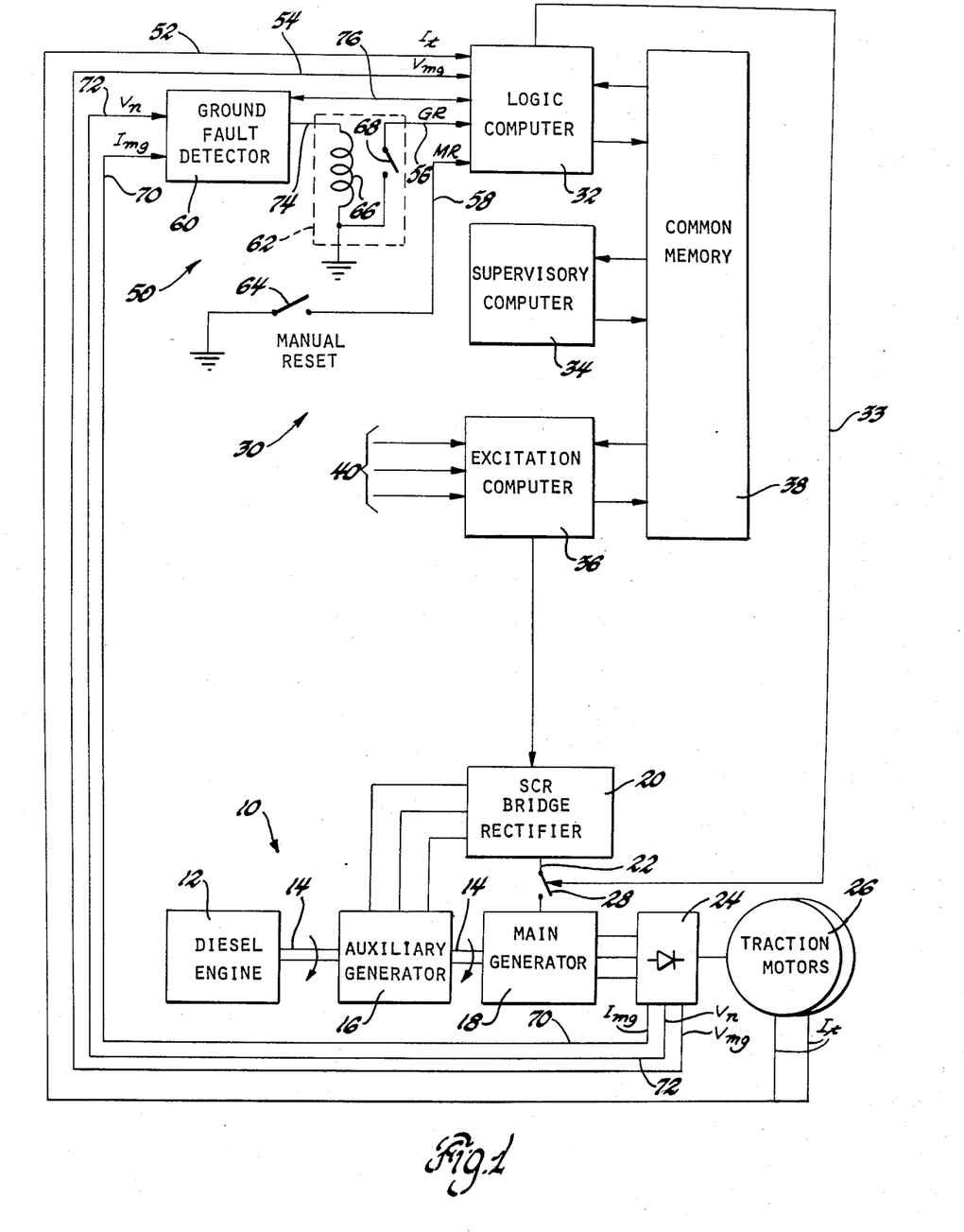
FIG. 1 a block diagram of a locomotive power train and a traction motor computerized controller according to this invention.

Referring now more particularly to FIG. 1, the reference numeral 10 generally designates a locomotive power train comprising a diesel engine 12, the output shaft 14 of which mechanically drives a three-phase AC auxiliary generator 16 and a three-phase AC main generator 18. The three-phase output of the auxiliary generator 16 is rectified by the SCR bridge rectifier 20 to provide energization for the main generator field winding via the line 22, and the three-phase output of the main generator 18 is rectified by the bridge rectifier 24 for energizing the DC traction motors, generally designated by the reference numeral 26. A cutout switch, generally designated by the reference numeral 28 is provided in the line 22 between the SCR bridge rectifier 20 and the main generator field winding, which switch may be opened to interrupt the supply of voltage to traction motors 26 as will later be described. The field winding of the auxiliary generator is supplied by a self-excited DC source, not shown.

The reference numeral 30, generally designates a locomotive traction motor controller comprising three separate computers 32, 34 and 36, sharing a common memory 38. The Logic computer 32 is responsive to a number of operator and power train related inputs, and operates, as will be described below, to develop various desired operating parameters for the locomotive power train 10 and to control actuation of the switch 28 via line 33 in the event interruption of the motor voltage supply is indicated. The Excitation computer 36 is responsive to the desired operating parameter values developed by the Logic computer 32 and also to various power train related inputs, designated generally by the reference numeral 40, and operates to control the SCR bridge rectifier 20 in a manner to provide the desired power train response. The Supervisory computer 34 is responsive to the sensing of a ground fault and operates as explained below to adjust the value of a motor voltage limit stored in the common memory 38 so as to permit continued motor operation at a reduced power level in the event a moisture induced ground fault occurs. The program instructions executed by the Logic computer 32 in the performance of its functions are represented by the flow-diagrams of FIG. 2; the program instructions executed by the Supervisory computer 34 are represented by the flow diagrams of FIGS. 3 and 4A and 4B. Program instructions executed by the Excitation computer 36 are outside the scope of this invention and are not set forth herein. Likewise, various program instructions executed by the Logic computer 32 and the Supervisory computer 34 for performing functions not within the scope of this invention are not depicted herein.

The Logic computer inputs used in the generation of the power train desired operating parameters are indicated generally by the reference numeral 50. Such inputs include one or more traction motor current signals $I_t$ on line 52, a main generator voltage signal $V_{mg}$ on line 54, a ground relay signal GR on line 56 and a manual reset signal MR on line 58. The motor current and main generator voltage signals $I_t$, $V_{mg}$ on lines 52 and 54, are obtained in a conventional manner from the respective traction motors 26 and main generator rectifier 24. The ground relay signal GR on line 56 is obtained from a ground fault detector 60 and a ground relay 62, as described below. The manual reset signal MR on line 58 is obtained from a manually operated reset switch 64 located in the operator compartment of the locomotive. The motor current and main generator voltage signals $I_t$, $V_{mg}$ on lines 52 and 54 are applied to the Logic computer 32 in an analog format and are converted to a digital format by an analog-to-digital converter (not shown) within the Logic computer 32. The ground relay and manual reset signals GR, MR on lines 56 and 58 are digital in format and are applied to interrupt inputs of the Logic computer 32. The ground relay signal GR on line 56 is applied to a nonmaskable interrupt input (NMI) while the manual reset signal MR on line 58 is applied to a maskable interrupt input (MI). When the coil 66 of ground relay 62 is energized to close the normally open ground relay contacts 68, the nonmaskable interrupt is triggered and the Logic computer immediately executes an interrupt service routine represented by the flow diagram of FIG. 2B. When the maskable interrupt is active and the operator of the locomotive closes the manual reset switch 64, the Logic computer 32 executes an interrupt service routine represented by the flow diagram of FIG. 2C.

The ground fault detector 60 receives a main generator current signal $I_{mg}$ on line 70 and a neutral voltage signal $V_n$ on line 72, which signals are obtained from the main generator bridge rectifier 24. The presence of a flashover or ground fault disturbs the normal relationship between the signals, and the ground fault detector 60 is effective under such circumstances to energize the coil 66 of ground relay 62 via line 74 to close the contacts 68 and trigger the nonmaskable interrupt of Logic computer 32 as described above. When a reset of the ground relay 62 is appropriate, the Logic computer 32 signals the ground fault detector 60 via the line 76, and the supply of current to coil 66 is interrupted to return contacts 68 to their normally open state.

Figure 2A:
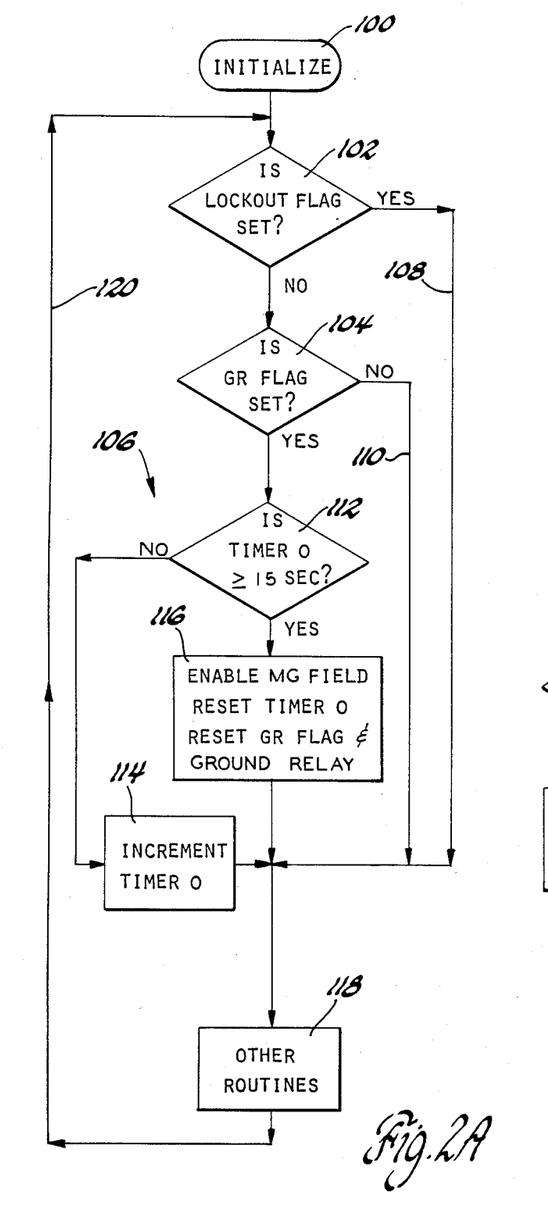
FIGS. 2A-2C through 4A-4B depict flow charts representative of the program instructions executed by the various computers shown in FIG. 1.
Figure 2B:
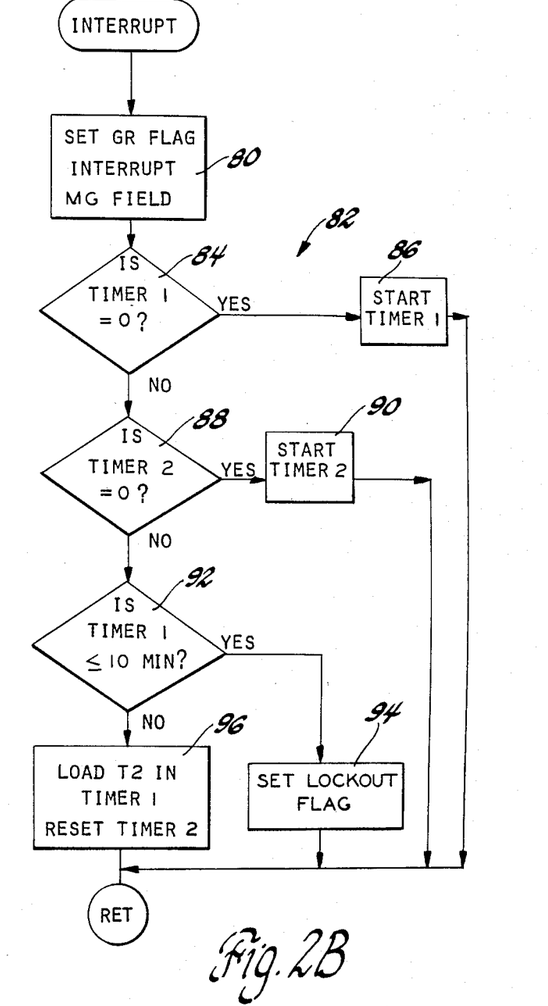
Figure 2C:
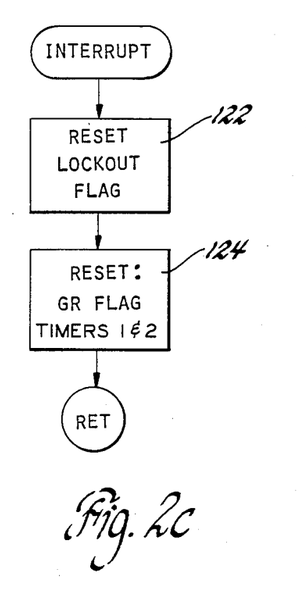

Referring now to FIGS. 2A-2C, the various flow diagrams representative of program instructions executed by the Logic computer 32 are shown. FIG. 2A depicts certain portions of a main program, while FIGS. 2B and 2C depict interrupt service routines. The interrupt service routine of FIG. 2B is executed each time the ground fault detector 60 energizes the ground relay 62, and the interrupt service routine of FIG. 2C is executed when the operator of the locomotive closes the manual reset switch 64. Essentially, the Logic computer 32 operates to effect an interruption of motor voltage at each occurrence of a ground fault. This function is effected by the routine depicted in FIG. 2B. Ordinarily, the interruption of motor voltage is temporary and motor voltage may be reapplied after a timed interval—15 seconds in the illustrated embodiment. This function is performed by the main program of FIG. 2A. However, if three ground faults occur within a specified time period—ten minutes in the illustrated embodiment—a lockout mode is established to make the interruption of motor voltage semi-permanent. This function is also performed by the routine depicted in FIG. 2B. After a lockout mode has been established, it can only be cleared by closing the manual reset switch 64. Such switch is not easily accessible to the operator of the locomotive and is normally operated by service personnel. In such event, the routine depicted in FIG. 2C functions to clear the lockout mode and permit reapplication of motor voltage.

Referring now more particularly to the interrupt service routine depicted in FIG. 2B, the instruction block 80 is first executed to set a ground relay (GR) flag in common memory 38 to indicate that a ground relay has occurred and to open the switch 28 for interrupting the supply of voltage to the traction motors 26. Then, a series of instructions designated generally by the reference numeral 82 are executed to establish a lockout mode if three or more ground faults have occurred within ten minutes. Initially, the counts T1 and T2 in TIMER 1 and TIMER 2, respectively, are reset to zero. Thus, the decision block 84 is answered in the affirmative when the first ground fault occurs. At such point, instruction block 86 is executed to start the counting of TIMER 1. When a second ground fault occurs, the decision block 84 is answered in the negative and the decision block 88 is answered in the affirmative. In such case, the instruction block 90 is executed to start the counting of TIMER 2. On the occurrence of a third ground fault, the decision blocks 84 and 88 are both answered in the negative and the decision block 92 is executed to determine if the count in TIMER 1 is less than or equal to ten minutes. If so, three ground faults have occurred within ten minutes and the instruction block 94 is executed to establish a lockout mode by setting the lockout flag. If, at decision block 92, it is determined that the count in TIMER 1 is greater than ten minutes, there have been less than three ground faults in the prior ten minute interval and the instruction block 96 is executed to load the count T2 from TIMER 2 into TIMER 1 and to reset the count T2 in TIMER 2 to zero. In this way, the count corresponding to the third last ground fault sensed by the ground fault detector 60 is erased and the count T1 in TIMER 1 is referenced to the second last ground fault. On the occurrence of a fourth ground fault, the decision blocks 84 and 88 are again answered in the negative and the decision block 92 is executed as above to determine if the count T1 in TIMER 1 is less than or equal to ten minutes. It will thus be understood that the count T1 in TIMER 1 at the point of decision block 92 is always referenced to the second last ground fault.

Referring now more particularly to the main flow chart depicted in FIG. 2A, the reference numeral 100 designates a series of program instructions executed at the initiation of each period of locomotive operation for initializing the logic values of the various program variables, timers and flags within the Logic computer 32. Thus, the counts in the various timers are reset to zero, and the flags are reset. Following the execution of such initialization procedures, the decision block 102 is executed to determine if the lockout flag is set, indicating that a lockout mode has been established. If not, the decision block 104 is executed to determine if the ground relay (GR) flag is set. If so, then a temporary interruption of the motor voltage is in effect and the instruction blocks designated generally by the reference numeral 106 are executed to time a fifteen second interval after which the reapplication of motor voltage is permitted. If decision block 102 is answered in the affirmative (lockout flag set) or decision block 104 is answered in the negative (GR flag not set), the instruction blocks indicated generally by the reference numeral 106 are skipped as indicated by the flow diagram lines 108 and 110. When the execution of the instruction blocks designated generally by the reference numeral 106 is appropriate, the decision block 112 is first executed to determine if the count in TIMER 0 (the timer used to count the fifteen second interval) is greater than or equal to fifteen seconds. If not, the instruction block 114 is executed to increment the count in TIMER 0. If the count in TIMER 0 is greater than or equal to fifteen seconds, the instruction block 116 is executed to enable reapplication of motor voltage, to reset the count in TIMER 0 to zero, and to reset the ground relay 62 (via line 76) and the ground relay (GR) flag. At such point, other routines designated by the reference numeral 118 are executed for performing other Logic computer functions, after which the decision block 102 is reexecuted as indicated by the flow return line 120.

The interrupt service routine depicted in FIG. 2C is initiated by the closure of the manual reset switch 64 and comprises the instruction blocks 122 and 124. The instruction block 122 operates to reset the lockout flag and the instruction block 124 operates to reset the ground relay (GR) flag and the TIMERS 1 and 2.

Figure 3:
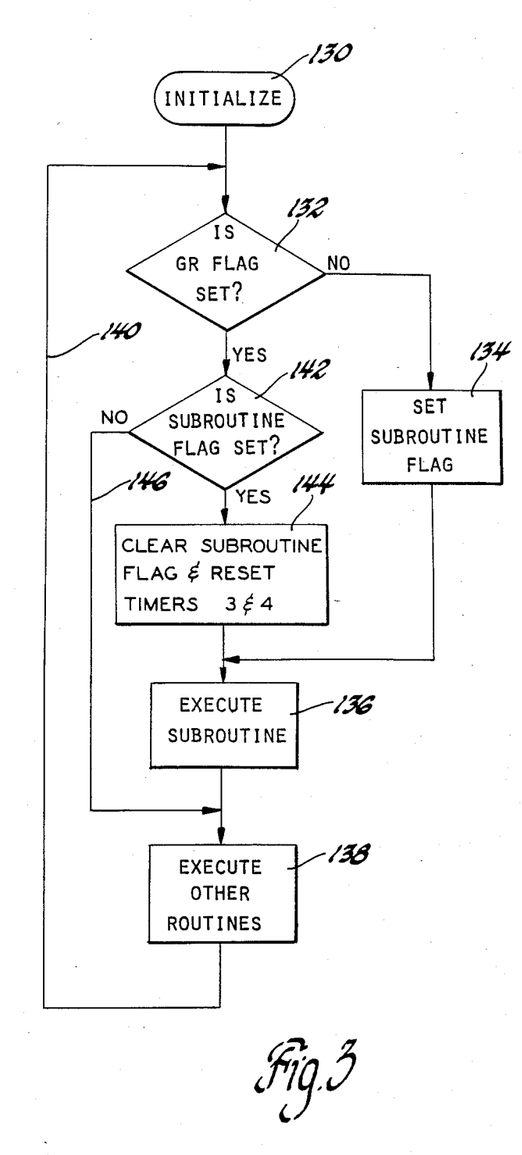
Figure 4A:
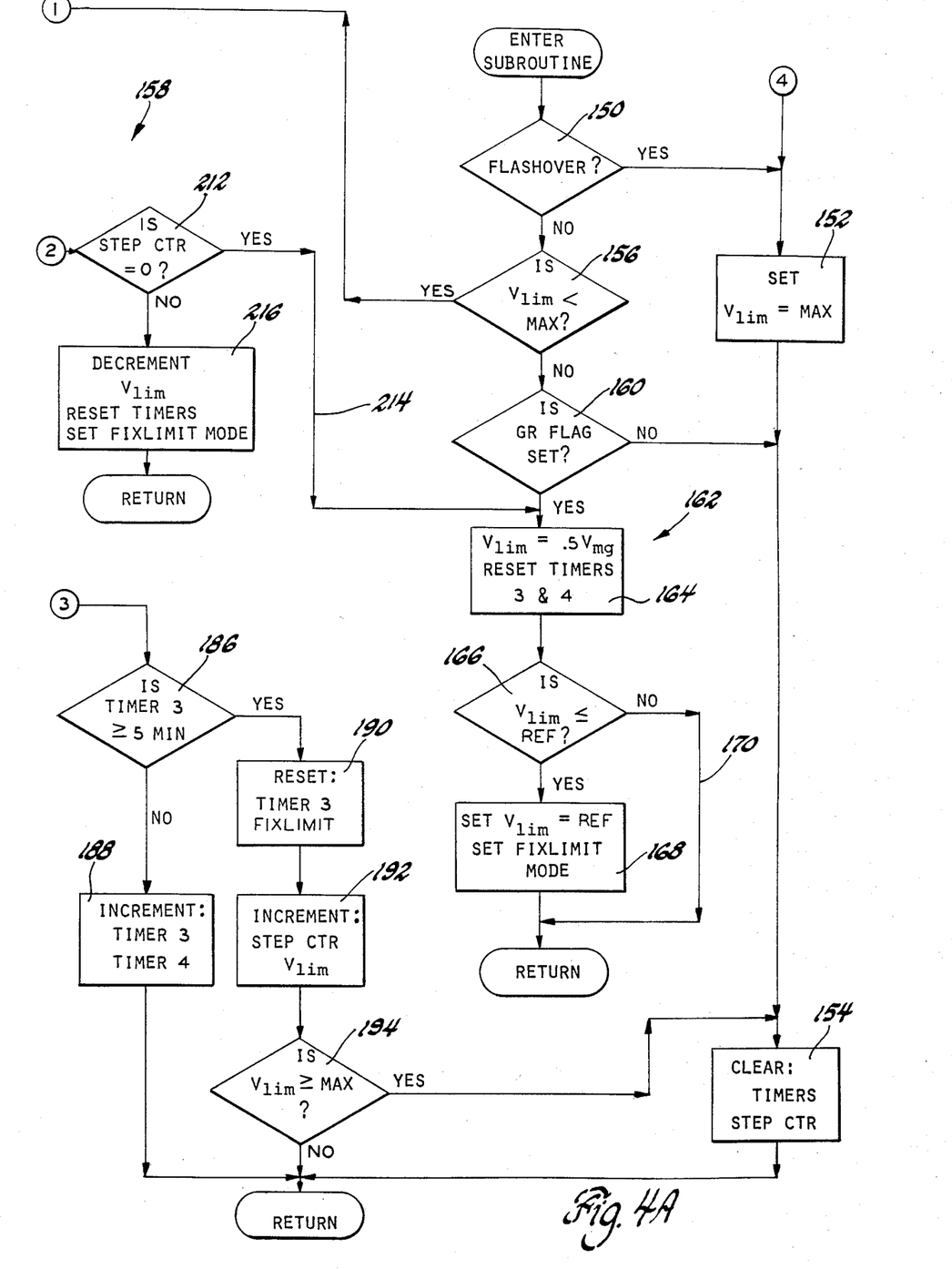
Figure 4B:
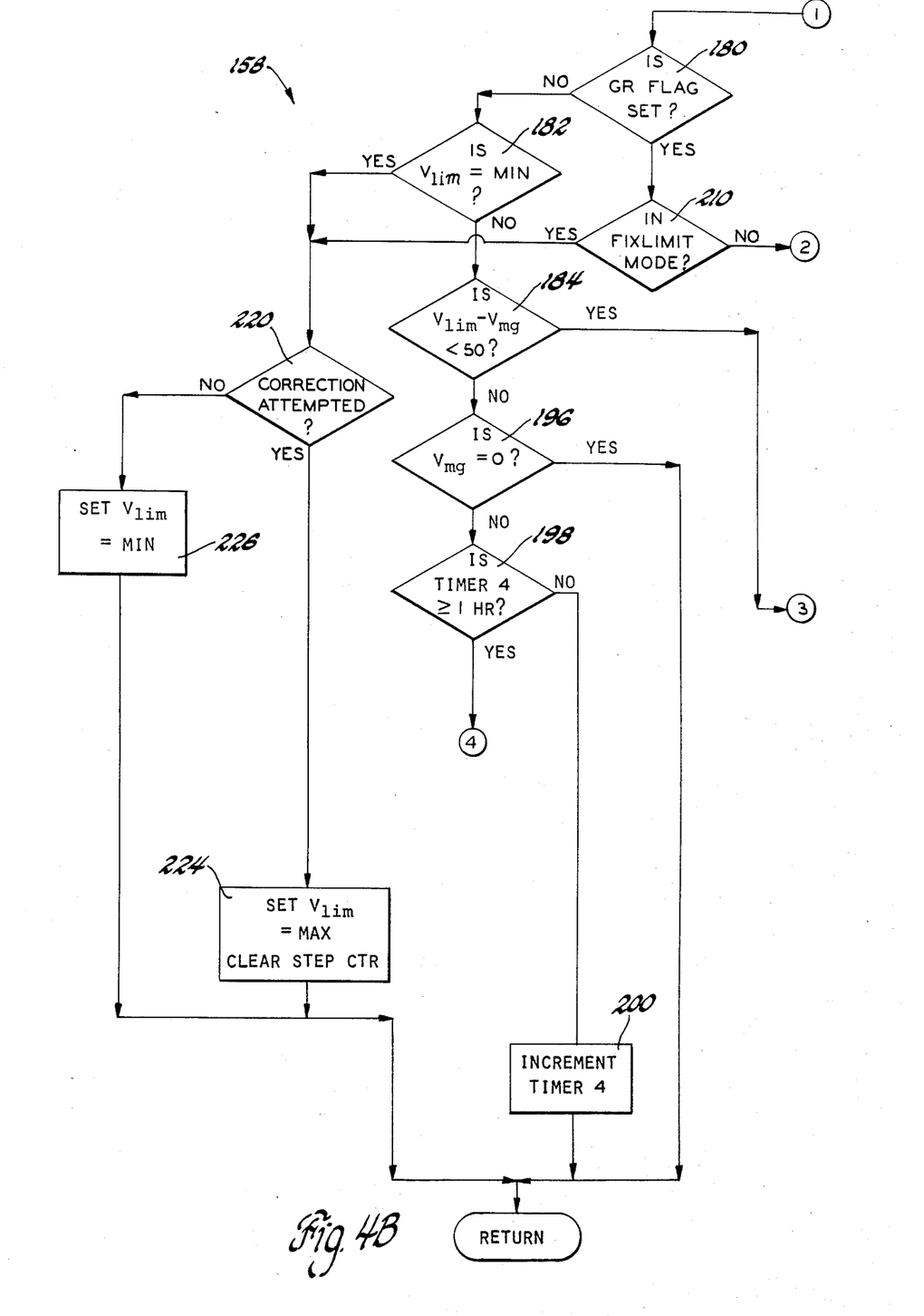

FIGS. 3 and 4A and 4B depict flow diagrams representative of program instructions executed by the Supervisory computer 34. The main or executive flow diagram is depicted in FIG. 3 and the subroutine flow diagram which controls adjustment of the motor voltage limit value is depicted in FIGS. 4A and 4B. The function of the main or executive flow diagram depicted in FIG. 3, as it pertains to the present invention, is to make sure that the subroutine program is executed at the proper time. According to this invention, the subroutine program is executed once when the occurrence of a ground fault is sensed (as indicated by the status of the ground relay flag), and periodically after the expiration of the temporary interruption of motor voltage effected by the Logic computer as explained above.

Referring now more particularly to the main or executive flow diagram depicted in FIG. 3, the reference numeral 130 generally designates a series of program instructions executed at the initiation of each period of locomotive operation for initializing the various program variables, timers and flags as explained above in reference to block 100 of FIG. 2A. Following the execution of such initialization procedures, the decision block 132 is executed to determine if the ground relay flag (GR) is set. If not, the instruction blocks 134 and 136 are executed to set the subroutine flag and to execute the subroutine. Other routines are also executed as indicated by instruction block 138 for performing other Supervisory computer functions, and the decision block 132 is then reexecuted as indicated by the flow diagram line 140. On the occurrence of a ground fault and the setting of the ground relay (GR) flag by the Logic computer 32, the decision block 132 is answered in the affirmative and the decision block 142 is executed to determine if the subroutine flag is set. At such point, the decision block 142 is answered in the affirmative and the instruction blocks 144 and 136 are executed to clear the subroutine flag, to reset the subroutine TIMERS 3 and 4, and to execute the subroutine. As indicated above, the instruction block 138 is also executed at such time to perform other Supervisory computer functions. On the next execution of the main or executive program, the decision block 132 is answered in the affirmative and the decision block 142 is answered in the negative. At such point, the execution of instruction blocks 144 and 136 is skipped, as indicated by the flow diagram line 146. At the termination of the temporary interruption of motor voltage, the ground relay (GR) flag is reset by the Logic computer 32 as described above, and the decision block 132 is answered in the negative. Then the instruction blocks 134, 136 and 138 are executed as described above to set the subroutine flag, execute the subroutine and all other routines performed by the Supervisory computer 34.

Referring now to the Supervisory computer subroutine flow diagram depicted in FIGS. 4A and 4B, the reference numeral 150 designates a decision block for determining if a flashover has been detected in the traction motors 26. As indicated above, the occurrence of a flashover is detected by monitoring past successive readings of motor current for an excessively high increase in the current with respect to time, such increase being indicative of the electrical arcing which is characteristic to the flashover phenomenon. If flashover is indicated, reduction of the motor voltage is not the desired remedy, and the instruction blocks 152 and 154 are executed to set the motor voltage limit to a maximum value MAX determined by the motor design limits and to clear the step counter and various timers used in the subroutine. If the occurrence of flashover is not indicated, decision block 156 is executed to determine if the voltage limit $V_{lim}$ is less than its maximum value MAX. If so, voltage limiting has already occurred and the instruction block set designated generally by the reference numeral 158 is executed to determine if an increase in the voltage limit $V_{lim}$ is in order. If the voltage limit $V_{lim}$ is at its maximum value, voltage limiting is not in effect, and the decision block 160 is executed to determine if the ground relay (GR) flag is set. If not, the voltage limiting is not appropriate and the instruction block 154 is executed to clear the step counter and various timers used in voltage limiting as described above. If the ground relay (GR) flag is set, the instruction blocks designated generally by the reference numeral 162 are executed to effect a reduction of the voltage limit so as to permit continued motor operation at a lower power level following the temporary interruption of motor voltage effected by the Logic computer 32.

The instruction blocks designated generally by the reference numeral 162 serve to reduce the voltage limit $V_{lim}$ to one half of the motor voltage value in effect just prior to the occurrence of the subject ground fault. This function is performed by the instruction block 164 which also operates to reset the TIMERS 3 and 4 used at a later point in the subroutine to time the five minute and one hour intervals, respectively. Then the decision block 166 is executed to determine if the voltage limit $V_{lim}$ has been reduced to a reference low value REF. If so, instruction block 168 is executed to establish a Fixlimit mode of operation. On further incidence of a ground fault, no increase in the voltage limit $V_{lim}$ is permitted until the operator of the locomotive has attempted to correct the problem which caused the ground fault. If not, the execution of instruction block 168 is skipped, as indicated by the flow diagram line 170. At such point, the Supervisory computer 34 is returned to the instruction block 138 in the main or executive flow diagram depicted in FIG. 3. The subroutine of FIG. 4 is not executed again until the expiration of the fifteen second interruption of motor voltage effected by the Logic computer 32. At such time, the subroutine decision block 156 is answered in the affirmative if there is no flashover, (assuming the voltage limit $V_{lim}$ has been reduced as described above) and the instruction blocks designated generally by the reference numeral 158 are executed to determine if an increase or a further decrease in the voltage limit $V_{lim}$ is in order.

Referring now to the subroutine flow diagram portion designated generally by the reference numeral 158, a decision block 180 is first executed to determine if the ground relay (GR) flag is set. If not, the decision block 182 is executed to determine if the voltage limit $V_{lim}$ is equal to its minimum value (MIN). If so, no increases in the voltage limit $V_{lim}$ are permitted until the operator attempts a corrective action as described below. If the voltage limit $V_{lim}$ is at a value greater than its minimum value (MIN), an increase in the voltage limit $V_{lim}$ may be appropriate. Specifically, the voltage limit $V_{lim}$ is incremented if the traction motors 26 have been successfully operated within fifty volts of the voltage limit $V_{lim}$ for a period of five minutes or more. If the traction motors 26 are operated for a cumulative period of one hour (not necessarily within 50 volts of $V_{lim}$), the voltage limit $V_{lim}$ is returned to the maximum value MAX. As indicated above, the heat generated by a loaded traction motor causes a drying of the moisture which induced the ground faults. Experience has shown that if the traction motors are operated within fifty volts of the voltage limit $V_{lim}$ for at least five minutes, the moisture will have dried sufficiently to permit successful motor operation at a higher voltage level. If the traction motors 26 are being loaded at a lower level, the heat thereby produced is lower, and the traction motors 26 must be operated successfully for a period of one hour before the moisture is presumed to be dried. The TIMER 3 is used to count the five minute interval while the TIMER 4 is used to count the one hour interval. The counts in TIMER 3 and TIMER 4 are reset at the expiration of each temporary interruption of motor voltage as described above in reference to FIG. 3.

The decision block 184 determines if the main generator voltage $V_{mg}$ supplied to the traction motors 26 is within fifty volts of the voltage limit $V_{lim}$. If so, the decision block 186 (FIG. 4A) is executed to determine if the count in TIMER 3 is greater than or equal to five minutes. If not, the decision block 188 is executed to increment both TIMER 3 and TIMER 4. If the count in TIMER 3 is greater than or equal to five minutes, the decision blocks 190 and 192 are executed to reset the Fixlimit mode and the count in TIMER 3, to increment a step counter, and to increment the voltage limit $V_{lim}$. Then, the decision block 194 is executed to determine if the voltage limit $V_{lim}$ is greater than or equal to its maximum value (MAX). If so, voltage limit operation is unnecessary and the instruction block 154 is executed to clear the step counter and the various timers. If the traction motors 26 are not being operated within fifty volts of the voltage limit $V_{lim}$, the decision block 184 is answered in the negative, and the decision block 196 is executed to determine if the main generator voltage $V_{mg}$ is equal to zero. If so, the traction motors 26 are not being loaded and no increase in the voltage limit $V_{lim}$ is appropriate. If the traction motors 26 are being loaded, the decision block 196 is answered in the negative and the decision block 198 is executed to determine if the count in TIMER 4 is greater than or equal to one hour. If not, the instruction block 200 is executed to increment TIMER 4. If the count in TIMER 4 is greater than or equal to one hour, the instruction blocks 152 and 154 (FIG. 4A) are executed to set the voltage limit $V_{lim}$ equal to its maximum value (MAX), and to clear the various timers and step counter.

If it is determined at decision block 180 that the ground relay (GR) flag is set, further ground faulting has occurred, and the decision block 210 is executed to determine if the Fixlimit mode has been established. If not, the decision block 212 (Figure 4A) is executed to determine if the step counter is equal to zero. If the step counter is equal to zero, there have been no increases in the voltage limit $V_{lim}$ and the flow diagram portion designated generally by the reference numeral 162 (described above) is executed as indicated by the flow diagram line 214. If the step counter is not equal to zero, there has been an intermediate increase in the voltage limit $V_{lim}$ and the instruction block 216 is executed to decrement the voltage limit $V_{lim}$, to reset TIMER 3 and TIMER 4, and to establish the Fixlimit mode.

If it is determined at decision block 210, that the Fixlimit mode has been established, no increases in the voltage limit $V_{lim}$ will be permitted unless the operator of the locomotive has attempted a corrective action. Thus, the decision block 220 determines if the operator has attempted to isolate one or more of the traction motors 26. If such a correction attempt has been made, the instruction block 224 is executed to set the voltage limit $V_{lim}$ equal to its maximum value (MAX), and to clear the step counter. If no correction has been attempted, the instruction block 226 is executed to set the voltage limit $V_{lim}$ equal to its minimum value (MIN).

The function of the locomotive controller according to this invention will now be summarized for a typical period of locomotive operation during which moisture induced ground faulting occurs. Prior to the occurrence of a ground fault, the voltage limit $V_{lim}$ is set at its maximum value (MAX). The voltage limiting, if any, is performed by the Excitation computer 36. When the occurrence of a ground fault is sensed by the ground fault detector 60, the Logic computer 32 immediately effects an interruption of the supply of motor voltage for a fifteen second interval, and the Supervisory computer 34 reduces the voltage limit $V_{lim}$ to half of the main generator voltage $V_{mg}$ in effect prior to the occurrence of the ground fault. When the motor voltage is reapplied at the expiration of the fifteen second interval, the Excitation computer 36 limits the applied voltage in accordance with the new voltage limit $V_{lim}$. If further ground faulting occurs, the supply of motor voltage is interrupted for another fifteen second interval and the voltage limit $V_{lim}$ is reduced to one-half the main generator voltage in effect just prior to the second ground fault. If the ground faulting is due to a so-called hard failure, reducing the voltage limit will not cure the ground faulting and the Logic computer 32 will effect a lockout of the motor voltage after three ground faults have occurred within a ten minute interval. However, the reductions of the voltage limit $V_{lim}$ will permit continued motor operation if the ground faulting is moisture induced. According to this invention, the voltage limit $V_{lim}$ is reduced in the manner described above until it reaches a value for which continued motor operation can be successfully achieved. Normally, the heat generated by the continued motor operation albeit at a lower power level operates to dry the moisture that induced the ground faulting. As such, the voltage limit $V_{lim}$ may normally be increased periodically until the moisture is completely dried and no further voltage limiting is necessary. In the illustrated embodiment, the voltage limit $V_{lim}$ is increased by one step every time the traction motors 26 are operated within fifty volts of the voltage limit value for a period of five minutes. Cumulative successful motor operation at any level for a period of one hour causes the voltage limit $V_{lim}$ to be increased to its maximum value MAX. However, if the voltage limit $V_{lim}$ has to be decreased to or below a reference low value REF before continued motor operation can be successfully achieved, a Fixlimit mode is established, and on further incidence of a ground fault, no increases in the voltage limit $V_{lim}$ are permitted unless the operator of the locomotive attempts a corrective action.

If a ground fault occurs after the voltage limit $V_{lim}$ has been increased as described above, the voltage limit $V_{lim}$ is decreased to the voltage level for which successful motor operation was achieved. If the ground faulting is truly moisture induced, the traction motors should be capable of continued operation at the reduced voltage limit value with no ground faulting, and the voltage limit $V_{lim}$ may be increased in accordance with the guidelines described above. However, if further ground faulting occurs at the reduced voltage limit, it is unlikely that the ground faulting is moisture induced and the controller operates to reduce the voltage limit $V_{lim}$ to the reference value until the operator of the locomotive attempts a corrective action. Once a corrective action is taken, the voltage limit is increased to its maximum value (MAX). If the corrective action cured the problem, no ground faulting will occur; if the corrective action did not cure the problem, further ground faulting will likely occur and the operation described above will be repeated.

While this invention has been described in reference to the illustrated embodiment, it will be understood that the specified voltage and time values have been given primarily for the purpose of illustration and that other values may be appropriate. Further, it will be understood that various modifications to the illustrated embodiment will occur to those skilled in the art, and that systems incorporating such modifications may fall within the scope of this invention which is defined by the appended claims.

The embodiments of the invention in which an exclusive property or privilege is claimed are defined as follows:

1. For a locomotive system wherein operating voltage is supplied to the locomotive traction motor in accordance with operator demand up to a voltage limit having a maximum value determined in relation to the motor design limits, and wherein the motor voltage supply is temporarily interrupted in response to the sensing of a motor ground fault and permanently interrupted after a number of such temporary interruptions, apparatus for preventing a permanent interruption of motor voltage due to moisture induced ground faulting, comprising:

limit setting means effective in response to each sensing of a ground fault for reducing said voltage limit to a level determined in relation to the voltage supplied to said motor just prior to the occurrence of the ground fault, and further effective following each of said temporary interruptions of motor voltage supply for incrementing the voltage limit toward said maximum value whenever the motor is continuously operated for a second predetermined time interval with no ground faults, whereby when the sensed ground fault is moisture induced, the voltage limit reductions permit continued motor operation following the temporary interruption of motor voltage, and the voltage limit is returned to said maximum value as the heat generated by such continued motor operation dries the moisture which induced the ground fault.

2. Apparatus as set forth in Claim 1, wherein said limit setting means is effective in the event a ground fault occurs after the voltage limit is reduced to a reference low value in response to one or more sensed ground faults for preventing incrementing of the voltage limit until it is determined that corrective action has been attempted by the locomotive operator.

3. Apparatus as set forth in Claim 2, wherein said limit setting means is further effective after it is determined that corrective action has been attempted by the locomotive operator for increasing the voltage limit to said maximum value.

4. For a locomotive system including a motor voltage controller which supplies operating voltage to the locomotive traction motor in accordance with operator demand but which prevents the supplied voltage from exceeding a voltage limit having a maximum value determined in relation to the motor design limits, and which senses the occurrence of a traction motor ground fault, temporarily interrupts the motor voltage supply for a predetermined time interval in response thereto, and permanently interrupts the motor voltage supply after a number of such temporary interruptions occur within a specified time period, the improvement comprising:

limit setting means for preventing the permanent interruption of motor voltage due to moisture induced ground faulting, said limit setting means being (1) effective in response to each sensing of a ground fault by said motor voltage controller for reducing said voltage limit to a value substantially less than the voltage supplied to said motor just prior to the occurrence of the ground fault to thereby reduce the motor operating voltage to a value sufficiently low to permit continued motor operation following the temporary interruptions of motor voltage by said motor voltage controller when the sensed ground faulting is moisture induced; (2) effective following each of said temporary interruptions of motor voltage supply for incrementing the voltage limit toward said maximum value by a reference amount for each specified period of motor operation under a reduced voltage limit for which no ground faults occur to thereby progressively return the motor operating voltage to said maximum value as the heat generated by the motor operation dries the moisture which induced the ground faulting; and (3) effective in response to the sensing of a ground fault after an incrementing of the voltage limit toward the maximum value for decrementing the voltage limit by said reference amount to thereby permit continued motor operation and continued drying of the moisture following the temporary interruption of motor voltage by said motor voltage controller.

5. The improvement set forth in Claim 4, wherein said limit setting means is further effective upon decrementing said voltage limit to permit continued motor operation and continued drying of the moisture for establishing a mode of operation wherein further ground faulting causes the voltage limit to be reduced to a predetermined minimum value, and wherein further incrementing of the voltage limit is prevented until it is determined that corrective action has been attempted by the locomotive operator.

6. For a locomotive system including a motor voltage controller which supplies operating voltage to the locomotive traction motor in accordance with operator demand but which prevents the supplied voltage from exceeding a voltage limit having a maximum value determined in relation to the motor design limits, and which senses the occurrence of a traction motor ground fault, temporarily interrupts the motor voltage supply for a first predetermined time interval in response thereto and permanently interrupts the motor voltage supply after a number of such temporary interruptions occur within a specified time period, the improvement comprising:

limit setting means for preventing the permanent interruption of motor voltage due to moisture induced ground faulting, said limit setting means being effective in response to each sensing of a ground fault by said motor voltage controller for reducing said voltage limit to a value determined in relation to the voltage supplied to said motor just prior to the occurrence of the ground fault to thereby reduce the motor operating voltage to a value sufficiently low to permit continued motor operation following the temporary interruption of motor voltage by said motor voltage controller when the sensed ground faulting is moisture induced, and further effective following each of said temporary interruptions of motor voltage supply for incrementing the voltage limit toward said maximum value by a reference amount for each relatively short predetermined interval during which said motor operates at a voltage substantially as great as said voltage limit with no ground faulting, and for returning the voltage limit to said maximum value if said motor is cumulatively operated at any voltage for a relatively long predetermined interval with no ground faulting, whereby the motor operating voltage is returned to said maximum value as the heat generated by the motor operation dries the moisture which induced the ground faulting.

7. For a locomotive system wherein operating voltage is supplied to the locomotive traction motor in accordance with operator demand up to a voltage limit having a maximum value determined in relation to the motor design limits, and wherein the motor voltage supply is temporarily interrupted in response to the sensing of a motor ground fault and permanently interrupted after a number of such temporary interruptions, a method of operation for preventing the permanent interruption of motor voltage due to moisture induced ground faulting, comprising the steps of:

reducing said voltage limit in response to the sensing of a ground fault to a level determined in relation to the voltage supplied to said motor just prior to the occurrence of the ground fault; and incrementing the voltage limit toward said maximum value following each of said temporary interruptions of motor voltage supply whenever the motor is continuously operated for a second predetermined time interval with no ground faults, whereby when the sensed ground fault is moisture induced, the voltage limit reductions permit continued motor operation following the temporary interruption of motor voltage, and the voltage limit is returned to said maximum value as the heat generated by such continued motor operation dries the moisture which induced the ground fault.

8. The method as set forth in Claim 7, including the step of:

preventing the incrementing of the voltage limit until it is determined that corrective action has been taken by the locomotive operator in the event a ground fault occurs after the voltage limit has been reduced to a predetermined minimum value in response to one or more sensed ground faults.

9. For a locomotive system including a motor voltage controller which supplies operating voltage to the locomotive traction motor in accordance with operator demand but which prevents the supplied voltage from exceeding a voltage limit having a maximum value determined in relation to the motor design limits, and which senses the occurrence of a traction motor ground fault, temporarily interrupts the motor voltage supply for a predetermined time interval in response thereto, and permanently interrupts the motor voltage supply after a number of such temporary interruptions occur within a specified time period, a method of operation for preventing the permanent interruption of motor voltage due to moisture induced ground faulting, comprising the steps of:

reducing said voltage limit in response to each sensing of a ground fault by said motor voltage controller to a value substantially less than that supplied to said motor just prior to the occurrence of the ground fault to thereby reduce the motor operating voltage to a value sufficiently low to permit continued motor operation following the temporary interruption of motor voltage by said motor voltage controller when the sensed ground faulting is moisture induced;

incrementing the voltage limit toward said maximum value by a reference amount following each of said temporary interruptions of motor voltage supply for each specified period of motor operation under a reduced voltage limit for which no ground faults occur to thereby progressively return the motor operating voltage to said maximum value as the heat generated by the motor operation dries the moisture which induced the ground faulting; and decrementing the voltage limit by said reference amount in response to the sensing of a ground fault after an incrementing of the voltage limit toward said maximum value to thereby permit continued motor operation and continued drying of the moisture following the temporary interruption of motor voltage by said motor voltage controller.

10. For a locomotive system including a controller which supplies operating voltage to the locomotive traction motor in accordance with operator demand but which prevents the supplied voltage from exceeding a voltage limit having a maximum value determined in relation to the motor design limits, and which senses the occurrence of a traction motor ground fault, temporarily interrupts the motor voltage supply for a predetermined time interval in response thereto, and permanently interrupts the motor voltage supply after a number of such temporary interruptions occur within a specified time period, a method of operation for preventing the permanent interruption of motor voltage due to moisture induced ground faulting, comprising the steps of:

reducing said voltage limit in response to the sensing of a ground fault by said controller to a level determined in relation to the voltage supplied to said motor just prior to the occurrence of the ground fault;

incrementing the voltage limit toward said maximum value following each of said temporary interruptions of motor voltage supply for each relatively short predetermined interval during which said motor operates at a voltage substantially as great as said voltage limit with no ground faulting; and returning the voltage limit to said maximum value when the motor is operated for a relatively long predetermined interval at any voltage with no ground faulting, whereby when the sensed ground fault is moisture induced, the voltage limit reductions permit continued motor operation following the temporary interruption of motor voltage, and the voltage limit is returned to said maximum value as the heat generated by such continued motor operation dries the moisture which induced the ground fault.

* * * * *